US011042431B2

(12) United States Patent
Matsumoto et al.

(10) Patent No.: US 11,042,431 B2
(45) Date of Patent: Jun. 22, 2021

(54) CIRCUIT ARRANGEMENT REGION FAILURE PREDICTION APPARATUS AND METHOD BASED ON SENSOR OUTPUT SCORE

(71) Applicant: FUJITSU LIMITED, Kawasaki (JP)

(72) Inventors: Kunihiko Matsumoto, Kasuga (JP); Naoyuki Takeshita, Fukuoka (JP); Masahiro Dohi, Fukuoka (JP); Hisaya Urabe, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 16/391,967

(22) Filed: Apr. 23, 2019

(65) Prior Publication Data

US 2019/0354419 A1 Nov. 21, 2019

(30) Foreign Application Priority Data

May 16, 2018 (JP) .............................. JP2018-094842

(51) Int. Cl.
*G06F 11/07* (2006.01)
*G06F 11/34* (2006.01)
*G06F 11/20* (2006.01)

(52) U.S. Cl.
CPC ........ *G06F 11/076* (2013.01); *G06F 11/0736* (2013.01); *G06F 11/0754* (2013.01); *G06F 11/20* (2013.01); *G06F 11/348* (2013.01); *G06F 2201/81* (2013.01); *G06F 2201/85* (2013.01)

(58) Field of Classification Search
CPC . G06F 11/076; G06F 11/0736; G06F 12/0646
See application file for complete search history.

(56) References Cited

U.S. PATENT DOCUMENTS 9,793,899 B1 * 10/2017 Maillard .......... H03K 19/17764
10,169,065 B1 * 1/2019 Nye ..................... H04L 67/28
(Continued)

FOREIGN PATENT DOCUMENTS

| JP | 2006-173665 | 6/2006 |
| JP | 2006-309700 | 11/2006 |
| JP | 2011-216020 | 10/2011 |

OTHER PUBLICATIONS

S. Lopez-Buedo, J. Garrido and E. Boemo, "Thermal testing on reconfigurable computers," in IEEE Design & Test of Computers, vol. 17, No. 1, pp. 84-91, Jan.-Mar. 2000, doi: 10.1109/54.825679 (Year: 2000).*

(Continued)

*Primary Examiner* — Matthew M Kim
*Assistant Examiner* — Kurosu Risa Altaf
(74) *Attorney, Agent, or Firm* — Fujitsu Patent Center (57) ABSTRACT

A failure prediction apparatus includes a memory and a processor coupled to the memory. The processor acquires a score based on an output of each of a plurality of sensors associated with each of a plurality of circuit arrangement regions, in each of the plurality of circuit arrangement regions a logic circuit constructed by programming is arrangeable, and performs a process of making a determination on a possibility of an occurrence of a failure with respect to each of the plurality of circuit arrangement regions based on the score for each of the circuit arrangement regions.

16 Claims, 7 Drawing Sheets

(56) References Cited

U.S. PATENT DOCUMENTS

| | | | |
|---|---|---|---|
| 2006/0236209 A1* | 10/2006 | Aida | G06F 11/20 |
| | | | 714/768 |
| 2010/0100337 A1* | 4/2010 | Vichare | G06F 11/008 |
| | | | 702/34 |
| 2016/0300148 A1* | 10/2016 | Kelly | G06F 11/008 |
| 2019/0051363 A1* | 2/2019 | Raasch | G11C 29/76 |

OTHER PUBLICATIONS

C Bolchini, D Quarta, MD Santambrogio, GLSVLSI '07: Proceedings of the 17th ACM Great Lakes symposium on VLSIMar. 2007 pp. 55-60) (Year: 2007).*

T. Drahonovský, M. Rozkovec and O. Novák, "Relocation of reconfigurable modules on Xilinx FPGA," 2013 IEEE 16th International Symposium on Design and Diagnostics of Electronic Circuits & Systems (DDECS), Karlovy Vary, 2013, pp. 175-180, doi: 0.1109/DDECS.2013.6549812 (Year: 2013).*

* cited by examiner

CIRCUIT ARRANGEMENT REGION FAILURE PREDICTION APPARATUS AND METHOD BASED ON SENSOR OUTPUT SCORE

CROSS-REFERENCE TO RELATED APPLICATION

This application is based upon and claims the benefit of priority of the prior Japanese Patent Application No. 2018-94842, filed on May 16, 2018, the entire contents of which are incorporated herein by reference.

FIELD

The embodiments discussed herein are related to a failure prediction apparatus and a failure prediction method.

BACKGROUND

In a system including a programmable device such as a field-programmable gate array (FPGA), the following are known as techniques for reconstructing a logic circuit constructed in a certain region.

For example, in a case where a communication state value in a current wireless communication system deteriorates while a central processing unit (CPU) and a programmable electronic element group perform the current wireless communication, techniques for writing a program relating to the wireless communication system for another CPU and another programmable electronic element group are known.

There is also known a technique of reconstructing a reconfigurable circuit in a functional circuit block in which an error is detected using reconfiguration data read out from a memory in response to a detection of an error in a functional circuit block.

There is also known an information processing device which includes a failure system detection circuit that detects a processing system in which a failure has occurred and a reconstruction unit that reconstructs a processing system having the same function as the processing system in which a failure occurred in an FPGA when the failure is detected, and forming a new processing system.

Related techniques are disclosed in the following documents. Examples of the related art include Japanese Laid-open Patent Publication No. 2006-173665, Japanese Laid-open Patent Publication No. 2006-309700, and Japanese Laid-open Patent Publication No. 2011-216020.

SUMMARY

According to an aspect of the embodiments, a failure prediction apparatus includes a memory and a processor coupled to the memory. The processor acquires a score based on an output of each of a plurality of sensors associated with each of a plurality of circuit arrangement regions, in each of the plurality of circuit arrangement regions a logic circuit constructed by programming is arrangeable, and performs a process of making a determination on a possibility of an occurrence of a failure with respect to each of the plurality of circuit arrangement regions based on the score for each of the circuit arrangement regions.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In recent years, FPGAs have been densified and become important parts, so that a failure of a FPGA gives a very significant effect. In a case where it is required to replace a FPGA due to a failure of a FPGA, a user may not receive a service until a replacement is completed, thereby suffering an opportunity loss. A service provider may not earn profits during a system outage period, thereby suffering a shutdown loss.

In a case where it is possible to predict the occurrence of a failure for each circuit arrangement region when the FPGA has a plurality of circuit arrangement regions in which logic circuits constructed by programming may be arranged, it is possible to take measures such as evacuating the logic circuit constructed in the region in which the failure is predicted to another region.

Hereinafter, an example of an embodiment of the disclosed technology will be described with reference to the drawings. In the drawings, the same or equivalent constituent elements and parts are given the same reference numerals.

First Embodiment

Figure 1:
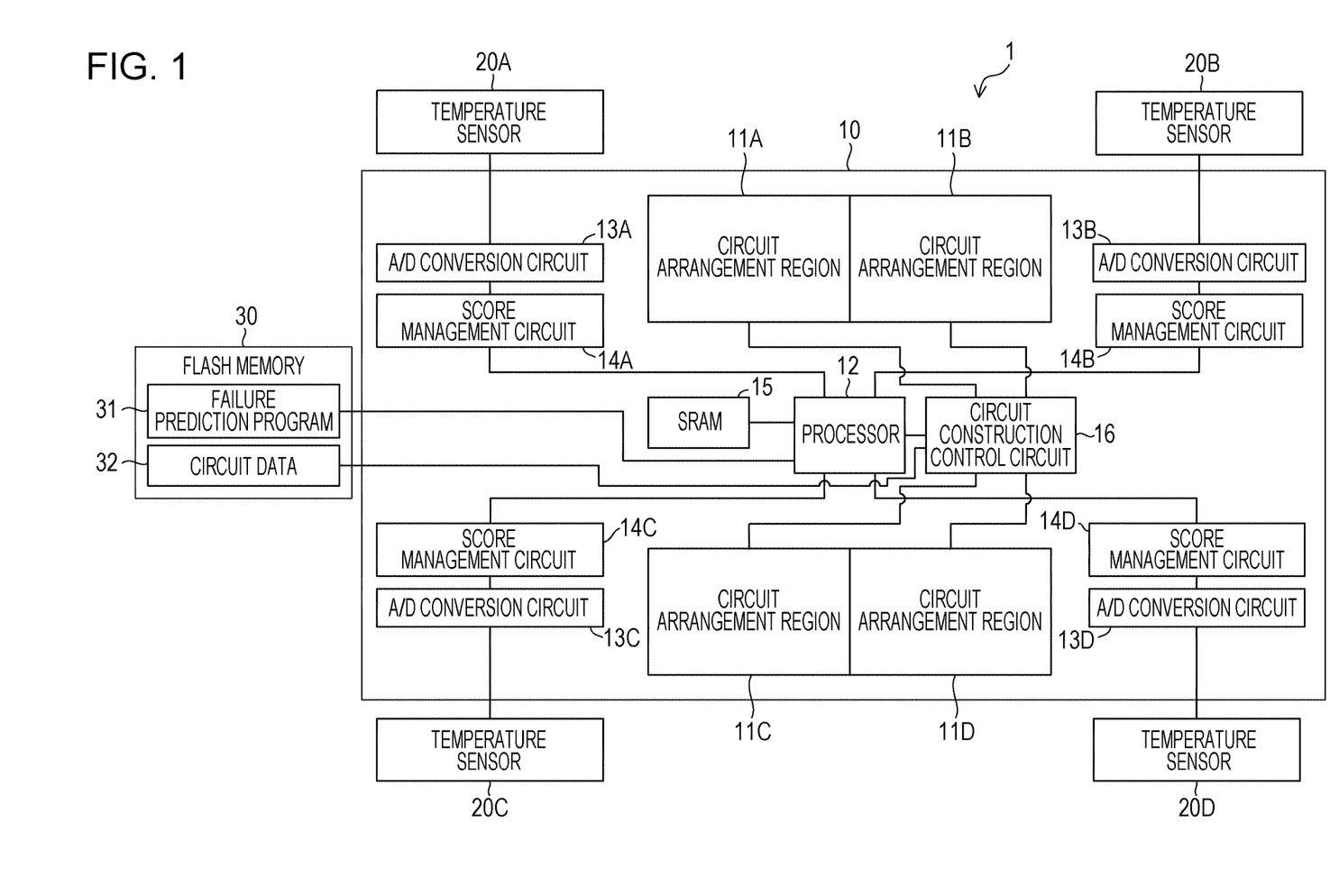
FIG. 1 is a block diagram illustrating an example of a configuration of a failure prediction apparatus according to a first embodiment of the disclosed technology.

FIG. 1 is a block diagram illustrating an example of a configuration of a failure prediction apparatus 1 according to a first embodiment of the disclosed technology. The failure prediction apparatus 1 includes an FPGA 10, temperature sensors 20A, 20B, 20C, and 20D, and a flash memory 30.

The FPGA 10 includes, for example, a plurality of circuit arrangement regions 11A, 11B, 11C and 11D in which logic circuits constructed by programming may be arranged. For example, writing, rewriting, and erasing of any logic circuit may be performed in the circuit arrangement regions 11A to 11D by programming.

The temperature sensors 20A, 20B, 20C and 20D correspond to the circuit arrangement regions 11A, 11B, 11C and 11D, respectively. In the present embodiment, the temperature sensors 20A to 20D are provided outside of the FPGA 10 and in the vicinity of the circuit arrangement regions 11A to 11D corresponding to the temperature sensors 20A to 20D, respectively. The temperature sensors 20A to 20D are mounted, for example, on a circuit board (not illustrated) common to the FPGA 10. Each of the temperature sensors 20A to 20D includes a known temperature detection element such as a thermistor, a thermocouple, a bimetal, or the like, and outputs a temperature measurement signal corresponding to the ambient temperature.

The FPGA 10 includes analog-to-digital conversion circuits 13A, 13B, 13C, 13D and score management circuits 14A, 14B, 14C, and 14D. The analog-to-digital conversion circuits 13A to 13D and the score management circuits 14A to 14D correspond to the temperature sensors 20A to 20D, respectively. The analog-to-digital conversion circuits 13A to 13D convert the respective temperature measurement signals output from the corresponding temperature sensors 20A to 20D into digital values (hereinafter referred to as temperature measurement values). The temperature measurement values output from the analog-to-digital conversion circuits 13A to 13D are sampled and stored by the corresponding score management circuits 14A to 14D at predetermined intervals (for example, at intervals of several seconds). The score management circuits 14A to 14D derive respective scores based on the stored temperature measurement values.

Table 1 below illustrates an example of scores derived by the score management circuits 14A to 14D. The score management circuits 14A to 14D store temperature measurement values $T_1$, $T_2$, $T_3$, . . . output from corresponding analog-to-digital conversion circuits 13A to 13D at predetermined intervals.

TABLE 1

| Temperature Measurement Value | $T_1$ | $T_2$ | $T_3$ | . . . |
|---|---|---|---|---|
| Score Based on Magnitude Of Temperature Measurement Value at Respective Times | $a_1$ | $a_2$ | $a_3$ | . . . |
| Score Based on Temperature Change | — | $b_2$ | $b_3$ | . . . |

The score management circuits 14A to 14D derive scores $a_1$, $a_2$, $a_3$, . . . determined according to the magnitudes of the temperature measurement values $T_1$, $T_2$, $T_3$, . . . at the respective times, and store the determined scores in the memory (not illustrate).

For example, in a case where the temperature measurement value $T_n$ is equal to or higher than the threshold value (for example, 70° C.), the score management circuits 14A to 14D derive and record a relatively large value (for example, 3) as the score $a_n$ corresponding to the temperature measurement value $T_n$. On the other hand, in a case where the temperature measurement value $T_n$ is less than the threshold value (for example, 70° C.), the score management circuits 14A to 14D derive a relatively small value (for example, 0) as the score $a_n$ corresponding to the temperature measurement value $T_n$. The score management circuits 14A to 14D may derive scores at respective times so that the score increases step by step with an increase in temperature measurement value. When the magnitude of the temperature measurement value $T_n$ is higher the upper threshold value (for example, 70° C.) or is lower than the lower threshold value (for example, 0° C.), the score management circuits 14A to 14D may derive a relatively large value (for example, 3) as the score $a_n$ corresponding to the temperature measurement value $T_n$. When the magnitude of the temperature measurement value $T_n$ is equal to or higher than the lower threshold value (for example, 0° C.) and is equal to or lower than the upper threshold value (for example, 70° C.), the score management circuits 14A to 14D may derive a relatively small value (for example, 0) as the score $a_n$ corresponding to the temperature measurement value $T_n$. The scores $a_1$, $a_2$, $a_3$, . . . determined according to the magnitudes of the temperature measurement values $T_1$, $T_2$, $T_3$, . . . are an example of the first score in the disclosed technology.

The score management circuits 14A to 14D further derive scores $b_2$, $b_3$, . . . determined according to the amount of change (difference) in the temperature measurement values $T_1$, $T_2$, $T_3$, . . . within a predetermined period, and record the derived scores in the memory (not illustrated). For example, the score management circuits 14A to 14D derive the score $b_2$ determined according to the difference between the temperature measurement value $T_1$ and the temperature measurement value $T_2$, and derive the score $b_3$ determined according to the difference between the temperature measurement value $T_2$ and the temperature measurement value $T_3$. In the above example, while the score is derived based on the difference between the temperature measurement values adjacent to each other (for example, the difference between $T_1$ and $T_2$, the difference between $T_2$ and $T_3$), it is possible to derive the score based on the difference between any temperature measurement values (difference between $T_n$ and $T_{n+m}$). When the difference between the temperature measurement value $T_n$ and the temperature measurement value $T_{n+m}$ is equal to or higher than the threshold value (for example, 10° C.), the score management circuits 14A to 14D derive a relatively large value (for example, 8) as the score $b_{n+m}$. On the other hand, in a case where the difference between the temperature measurement value $T_n$ and the temperature measurement value $T_{n+m}$ is less than the threshold value (for example, 10° C.), the score management circuits 14A to 14D derive a relatively small value (for example, 0) as the score $b_{n+m}$. The score management circuits 14A to 14D may derive scores at respective times so that the score increases step by step with an increase in the amount of change (difference) in the temperature measurement value within a predetermined period. The scores $b_2$, $b_3$, . . . determined according to the amount of change (difference) in the temperature measurement values $T_1$, $T_2$, $T_3$, . . . within the predetermined period are an example of the second score in the disclosed technology.

According to the score management by the score management circuits 14A to 14D, a relatively high score is given to, for example, the circuit arrangement region in which the high temperature state continues, the circuit arrangement region in which the temperature change is large, or the circuit arrangement region in which the temperature change is repeated among the circuit arrangement regions 11A to 11D.

A processor 12 functions as a failure prediction processing circuit by executing a failure prediction program 31 stored in the flash memory 30. The processor 12 functioning as the failure prediction processing circuit performs a failure prediction process including the determination on the possibility of the occurrence of a failure with respect to each of the circuit arrangement regions 11A to 11D based on the scores recorded in the score management circuits 14A to 14D. The processor 12 tabulates the scores recorded in the score management circuits 14A to 14D for each of the circuit arrangement regions 11A to 11D, and determines that the possibility of the occurrence of a failure of the circuit arrangement region is high in a case where the tabulation value obtained by the tabulation exceeds the threshold value. On the other hand, in a case where the tabulation value of the scores recorded in the score management circuits 14A to 14D for each of the circuit arrangement regions 11A to 11D is less than the threshold value, the processor 12 determines that the possibility of the occurrence of a failure of the circuit arrangement region is low.

A circuit construction control circuit 16 reconstructs a logic circuit constructed in a circuit arrangement region (hereinafter, also referred to as a high score region) which has been determined by the processor 12 that the possibility of the occurrence of a failure is high in the circuit arrangement region (hereinafter also referred to as a low score region) that has been determined by the processor 12 that the possibility of the occurrence of a failure is low among the circuit arrangement regions 11A to 11D. From the viewpoint of suppressing the power consumption, it is preferable to erase the logic circuits arranged in the high score region after reconstructing the logic circuit in the low score region. When reconstructing the logic circuit in the low score region, the circuit construction control circuit 16 refers to circuit data 32 stored in the flash memory 30. The circuit data 32 includes information on the configuration of the logic circuit to be reconstructed. The processor 12 and the circuit construction control circuit 16 are an example of processing circuits in the disclosed technology.

A static random access memory (SRAM) 15 is a storage region for temporarily storing instructions and data based on the failure prediction program 31 when the processor 12 functioning as a failure prediction processing circuit performs the failure prediction process. The flash memory 30 is a nonvolatile memory provided outside the FPGA 10. The failure prediction program 31 and the circuit data 32 are stored in the flash memory 30. The processor 12, the SRAM 15, the circuit construction control circuit 16, and the flash memory 30 are an example of computers in the disclosed technology.

Figure 2:
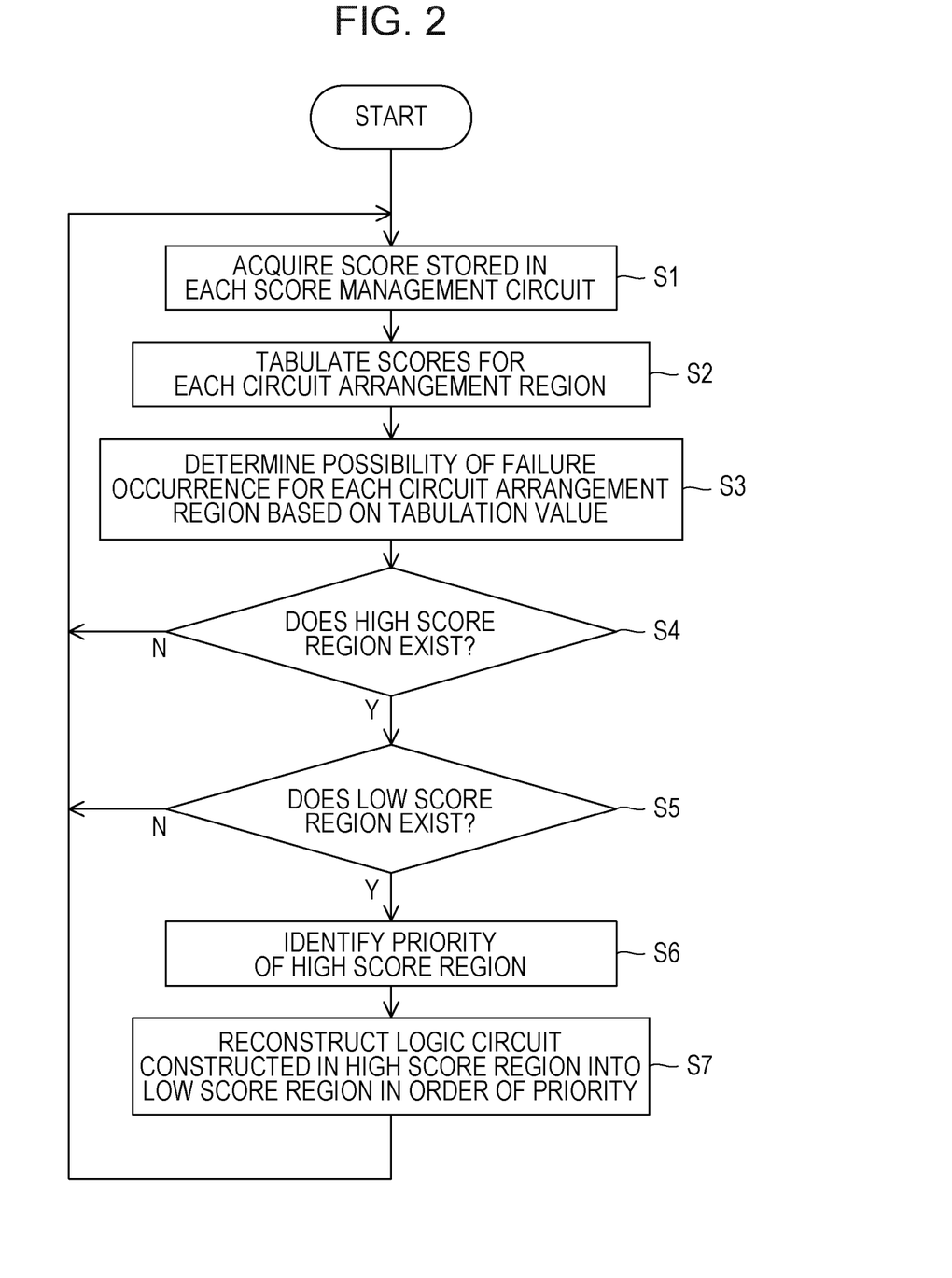
FIG. 2 is a flowchart illustrating an example of a flow of a failure prediction process executed by a processor according to the embodiment of the disclosed technology executing a failure processing program.

FIG. 2 is a flowchart illustrating an example of a flow of a failure prediction process executed by the processor 12 executing the failure prediction program 31.

In step S1, the processor 12 acquires the scores $a_1$, $a_2$, $a_3$, . . . and the scores $b_2$, $b_3$, . . . stored in each of the score management circuits 14A to 14D within a predetermined period (for example, several minutes).

In step S2, the processor 12 tabulates the acquired scores $a_1$, $a_2$, $a_3$, . . . and the scores $b_2$, $b_3$, . . . for each of the circuit arrangement regions 11A to 11D. For example, the processor 12 performs, for each of the circuit arrangement regions 11A to 11D, a process of tabulating the scores $a_1$, $a_2$, $a_3$, . . . and the scores $b_2$, $b_3$, . . . stored in each of the score management circuits 14A to 14D within the predetermined period.

In step S3, the processor 12 makes a determination on the possibility of the occurrence of a failure for each of the circuit arrangement regions 11A to 11D. For example, the processor 12 determines that the circuit arrangement region has a high possibility of the occurrence of a failure in a case where the tabulation value of the scores tabulated for each of the circuit arrangement regions 11A to 11D is equal to or larger than the threshold value. On the other hand, the processor 12 determines that the circuit arrangement region has a low possibility of the occurrence of a failure in a case where the tabulation value of the scores tabulated for each of the circuit arrangement regions 11A to 11D is less than the threshold value.

In step S4, the processor 12 determines the presence or absence of a circuit arrangement region (high score region) having a tabulation value of the scores which is equal to or greater than the threshold value. In a case where the processor 12 determines that there is the high score region, the process proceeds to step S5, and in a case where the processor 12 determines that there is no high score region, the process returns to step S1.

In step S5, the processor 12 determines the presence or absence of a circuit arrangement region (low score region) having a tabulation value of the scores which is less than the threshold value. In a case where the processor 12 determines that there is the low score region, the process proceeds to step S6, and in a case where the processor 12 determines that there is no low score region, the process returns to step S1.

In step S6, the processor 12 specifies the priority with respect to each of the high score regions. For example, the priority may be predetermined for each of the circuit arrangement regions 11A to 11D. Alternatively, the priority may be set based on the tabulation value of the scores. In this case, a relatively high priority is set for the high score region in which the tabulation value of the scores is relatively high. In a case where the number of the high score regions is one, the step S6 may be omitted.

In step S7, the processor 12 transmits, to the circuit construction control circuit 16, a command to reconstruct the logic circuit constructed in the high score region in the low score region in the order of the priority specified in step S6. Upon receiving the above command, the circuit construction control circuit 16 loads the circuit data 32 stored in the flash memory 30 and reconstructs the logic circuit in the low score region. Thereafter, the circuit construction control circuit 16 erases the logic circuit constructed in the high score region. The logic circuit constructed in the high score region may be left as it is, but in this case it is preferable to stop the function of the logic circuit.

It is preferable to select the low score region in which the tabulation value of the scores is relatively low as the reconstruction destination of the logic circuit constructed in the high score region in which the priority is relatively high. In a case where the number of the high score regions is one, it is preferable that the low score region in which the tabulation value of the scores is the lowest is selected as the reconstruction destination of the logic circuit constructed in the high score region. For example, in a case where there are three high score regions and only one low score region among the four circuit arrangement regions 11A to 11D, only the logic circuit constructed in the high score region having the highest priority may be reconstructed in the low score region. In a case where there are two high score regions and two low score regions, the logic circuit constructed in the high score region in which the priority is relatively high may be reconstructed in the low score region in which the tabulation value of the scores is relatively low. The logic circuit constructed in the high score region in which the priority is relatively low may be reconstructed in the low score region in which the tabulation value of the scores is relatively high.

The processor 12 executes the failure prediction program 31, so that the tabulation of the scores described above, the failure prediction for each circuit arrangement region based on the tabulation value of the scores, the reconstruction of the logic circuit based on the failure prediction result is performed at predetermined intervals.

In the present embodiment, in a case where it is determined in step S5 that there is no low score region, the process is returned to step S1, but the present embodiment is not limited to this mode. For example, in a case where the FPGA 10 includes a redundant region (not illustrated) in which a logic circuit may be arranged by programming in addition to the circuit arrangement regions 11A to 11D, all the logic circuits constructed in the circuit arrangement regions 11A to 11D may be reconstructed in the redundant region.

Figure 3:
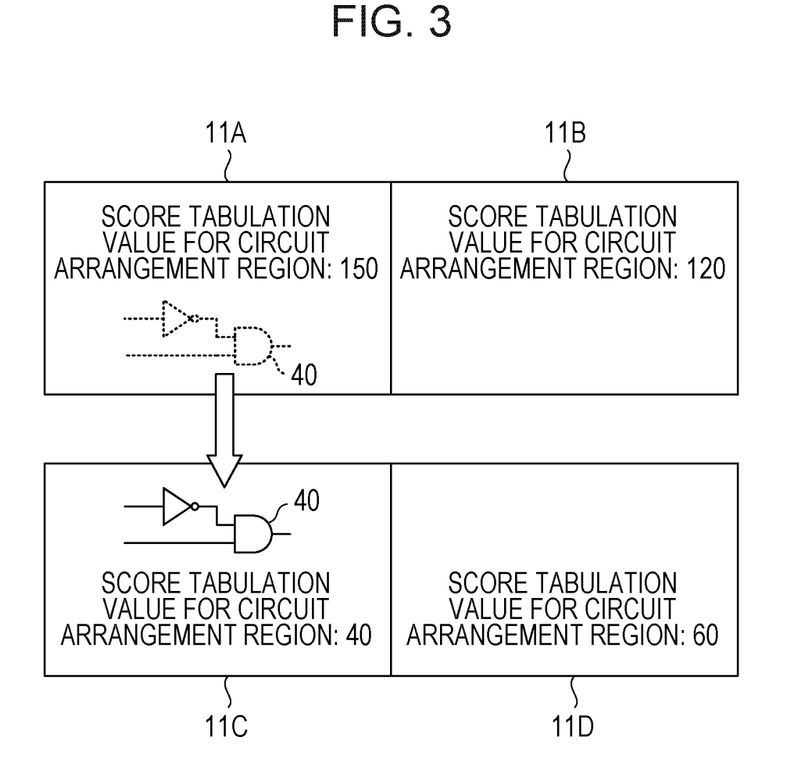
FIG. 3 is a diagram illustrating an example of a mode of a reconstruction of a logic circuit by a failure prediction apparatus according to the embodiment of the disclosed technology.

FIG. 3 is a diagram illustrating an example of a mode of a reconstruction of a logic circuit by the failure prediction apparatus 1. Here, it is assumed that a logic circuit 40 is constructed in the circuit arrangement region 11A, and the logic circuit is not constructed in the circuit arrangement regions 11B, 11C, and 11D. It is assumed that the tabulation value of the scores of the circuit arrangement region 11A is 150, the tabulation value of the scores of the circuit arrangement region 11B is 120, the tabulation value of the score of the circuit arrangement region 11C is 40, and the tabulation value of the scores of the circuit arrangement region 11D is 60. In a case where the tabulation value of the scores is 100 or more, it is determined that the circuit arrangement region is the high score region in which the possibility of the occurrence of a failure is high, and in a case where the tabulation value of the scores is less than 100, it is determined that the circuit arrangement region is the low score region in which the possibility of the occurrence of a failure is low. Therefore, it is determined that the circuit arrangement regions 11A and 11B are high score regions in which the possibility of the occurrence of a failure is high, and it is determined that the circuit arrangement regions 11C and 11D are low score regions in which the possibility of the occurrence of a failure is low. The logic circuit 40 constructed in the circuit arrangement region 11A which is the high score region in which the possibility of the occurrence of a failure is high is reconstructed in the circuit arrangement region 11C where the tabulation value of the scores is relatively low among the low score regions in which the possibility of the occurrence of a failure is low. From the viewpoint of suppressing the power consumption, it is preferable that the logic circuit 40 be erased from the circuit arrangement region 11A. Since the circuit arrangement region 11A has not actually failed, the circuit arrangement region 11A may be used as a candidate region in which the logic circuit 40 is reconstructed in a case where the circuit arrangement region 11A becomes the low score region.

Heat stress may be cited as a factor that causes the FPGA 10 to fail. For example, it is probable that the possibility that the FPGA 10 fails is high in a case where the high temperature state continues, the temperature change is large, or the temperature change is repeated. The heat stress is not uniform over the entire area of the FPGA 10. It is affected by, for example, the position of the heat source, the configuration of the heat radiating unit, the flow of air by the air cooling fan, and the like. Therefore, different magnitudes of heat stresses are applied to the circuit arrangement regions 11A to 11D inside the FPGA 10, and it is probable that there be different possibilities of the occurrence of a failure for the respective circuit arrangement regions 11A to 11D.

The failure prediction apparatus 1 according to the embodiment of the disclosed technology includes a plurality of temperature sensors 20A to 20D provided for corresponding circuit arrangement regions 11A to 11D included in the FPGA 10. Since the temperature sensors 20A to 20D are provided in the vicinities of the corresponding circuit arrangement regions 11A to 11D, the outputs of the temperature sensors 20A to 20D indicate the magnitudes of heat stresses applied to the corresponding circuit arrangement regions 11A to 11D. The failure prediction apparatus 1 derives the scores based on the outputs of the temperature sensors 20A to 20D and makes a determination on the possibility of the occurrence of a failure with respect to each of the circuit arrangement regions 11A to 11D based on the tabulation value of the scores tabulated for each circuit arrangement region. Therefore, the failure prediction apparatus 1 may predict the occurrence of a failure with respect to each of the circuit arrangement regions 11A to 11D. The score also reflects not only the magnitude of the temperature measurement values by the temperature sensors 20A to 20D but also the amount of change in the temperature measurement values within a predetermined period. This makes it possible to appropriately evaluate the magnitude of the heat stress and to improve the accuracy of prediction of the occurrence of a failure of the circuit arrangement regions 11A to 11D.

According to the failure prediction apparatus 1, the logic circuit constructed in the circuit arrangement region which has been determined to have a high possibility of the occurrence of a failure is reconstructed in the circuit arrangement region which has been determined to have a low possibility of the occurrence of a failure. For example, the logic circuits arranged in the high score region are moved to the low score region before the actual failure occurs. This makes it possible to suppress the risk of a shutdown of the logic circuit due to a failure, and to increase the availability of the system including the FPGA 10.

While, in the present embodiment, the FPGA 10 includes four circuit arrangement regions (circuit arrangement regions 11A to 11D), the number of circuit arrangement regions may be increased or decreased as appropriate. While, in the present embodiment, the temperature sensors 20A to 20D are provided outside the FPGA 10, part or all of the temperature sensors 20A to 20D may be provided inside the FPGA 10. While, in the present embodiment, the temperature sensors 20A to 20D are used as the sensors used for failure prediction of the circuit arrangement regions 11A to 11D, a sensor other than the temperature sensor may be used. A sensor (for example, a humidity sensor, a pressure sensor) capable of detecting a stress that causes a failure of the FPGA 10 may be used in place of or in combination with the temperature sensors 20A to 20D.

While, in the present embodiment, the failure prediction program 31 and the circuit data 32 are stored in the flash memory 30 provided outside the FPGA 10, the present embodiment is not limited to this mode. At least one of the failure prediction program 31 and the circuit data 32 may be stored in a nonvolatile memory provided inside the FPGA 10.

In the present embodiment, the case is exemplified in which a score determined according to the magnitude of the temperature measurement value and a score determined according to the amount of change (difference) in the temperature measurement value within the predetermined period are derived and the determination is made on the possibility of the occurrence of a failure based on the tabulation value of the derived scores. However, the present embodiment is not limited to this mode. For example, any one of the scores determined according to the magnitude of the temperature measurement value and the scores determined according to the amount of change (difference) in the temperature measurement value within the predetermined period is derived, and the determination is performed on the possibility of the occurrence of a failure based on the derived score.

Figure 4:
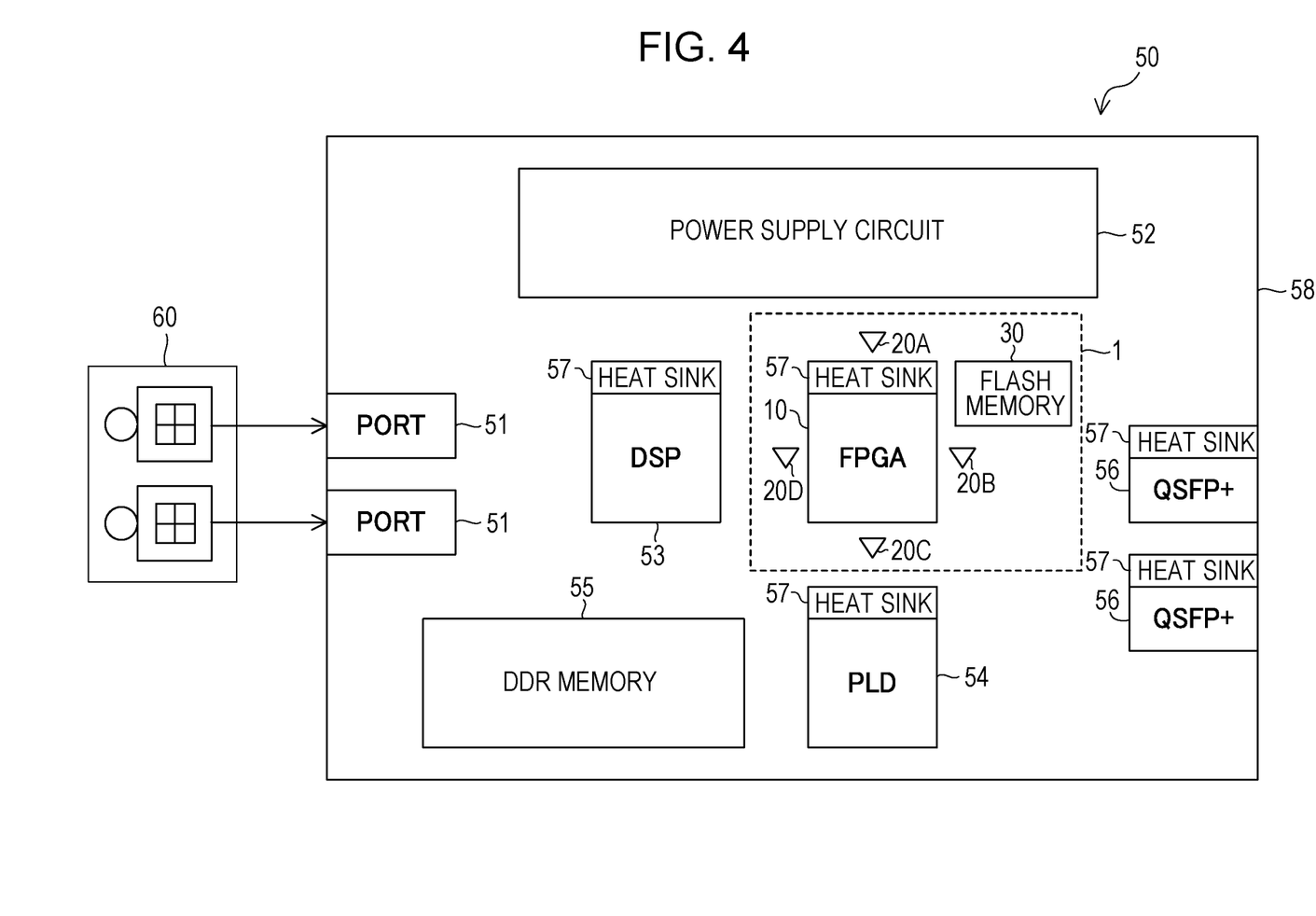
FIG. 4 is a diagram illustrating an example of a configuration of an image processing device including a failure prediction apparatus according to the embodiment of the disclosed technology.

FIG. 4 is a diagram illustrating an example of the configuration of an image processing device 50 according to an embodiment of the disclosed technology including the failure prediction apparatus 1. The image processing device 50 includes a pair of input ports 51, a power supply circuit 52, a digital signal processor (DSP) 53, a programmable logic device (PLD) 54, a double data rate (DDR) memory 55, a pair of quad small form-factor pluggable (QSFP) modules 56 and the FPGA 10 all of which are mounted on a circuit board 58. The temperature sensors 20A to 20D, the flash memory 30, and the FPGA 10 constituting the failure prediction apparatus 1 are mounted on the circuit board 58. A heat sink 57 is attached to each of the FPGA 10, the DSP 53, the PLD 54, and the QSFP modules 56, which are the heat sources.

The FPGA 10, the DSP 53, and the PLD 54 process an image captured by an image sensor 60 connected to the pair of input ports 51. Since the processing details of the FPGA 10, the DSP 53, and the PLD 54 change, for example, depending on the type (RAW, RGB, or the like) of the image captured by the image sensor 60, the heat quantities of the FPGA 10, the DSP 53 and the PLD 54 change moment by moment. Therefore, a local temperature rise may occur around the FPGA 10. For example, at a certain timing, the magnitude of the temperature measurement values by the temperature sensor 20C and its change amount may be higher the magnitudes of the temperature measurement values by the other temperature sensors 20A, 20B, 20D and their change amount. In this case, when the tabulation value of the scores based on the temperature measurement value by the temperature sensor 20C is equal to or more than the threshold value, it is determined that the possibility of the occurrence of a failure is high with respect to the circuit arrangement region corresponding to the temperature sensor 20C inside the FPGA 10. In this case, the logic circuit arranged in the circuit arrangement region corresponding to the temperature sensor 20C is reconstructed in any one of the circuit arrangement regions which have been determined to have a low possibility of the occurrence of a failure (preferably the circuit arrangement region having the lowest tabulation value of the scores).

Second Embodiment

Figure 5:
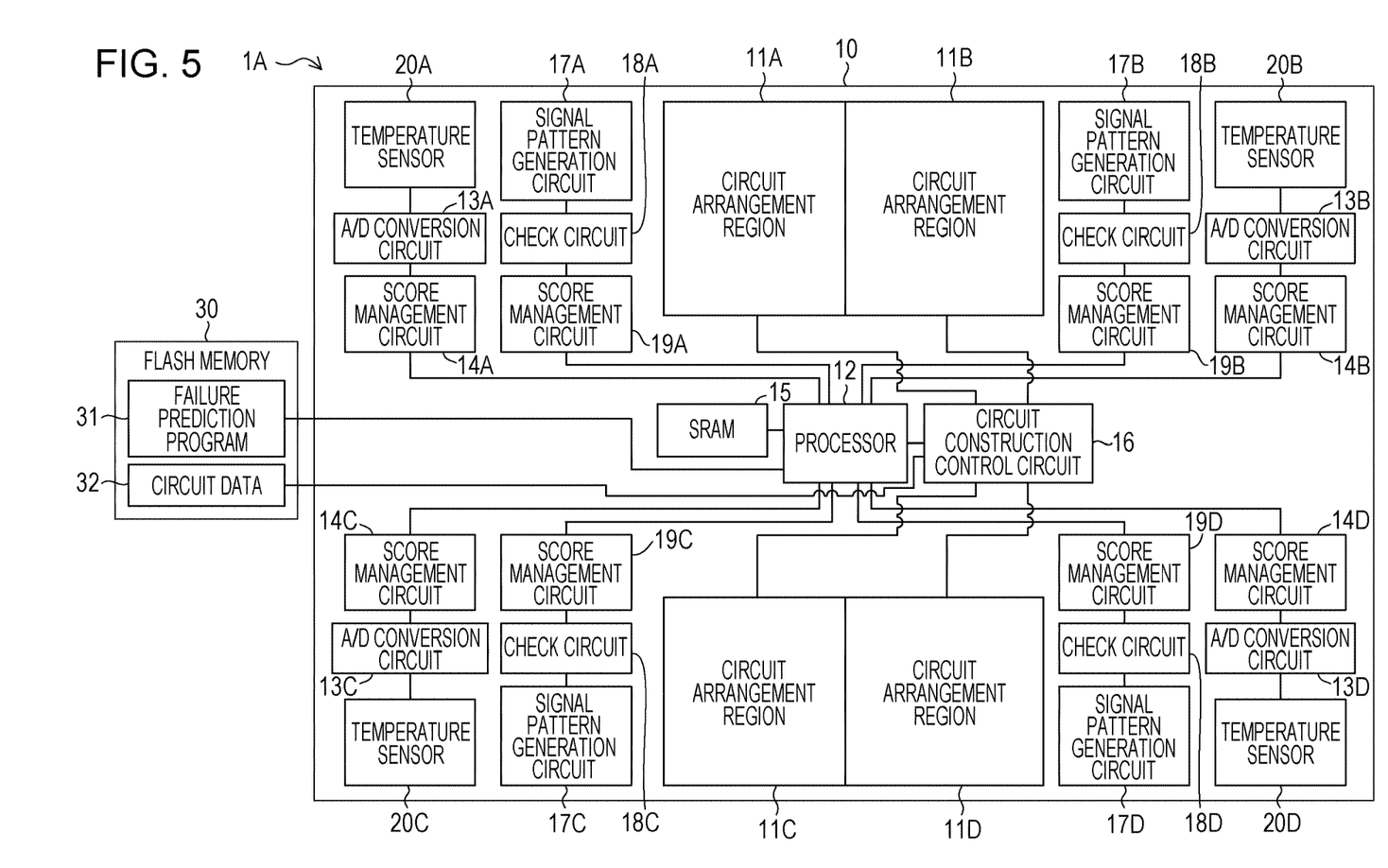
FIG. 5 is a block diagram illustrating an example of a configuration of a failure prediction apparatus according to a second embodiment of the disclosed technology.

FIG. 5 is a block diagram illustrating an example of a configuration of a failure prediction apparatus 1A according to a second embodiment of the disclosed technology. The failure prediction apparatus 1A is different from the failure prediction apparatus 1 according to the first embodiment in that the failure prediction apparatus 1A further includes signal pattern generators 17A, 17B, 17C, and 17D, check circuits 18A, 18B, 18C, and 18D, and score management circuits 19A, 19B, 19C, and 19D, all of which are provided inside the FPGA 10. The signal pattern generators 17A to 17D, the check circuits 18A to 18D, and the score management circuits 19A to 19D correspond to the circuit arrangement regions 11A to 11D, respectively. In the failure prediction apparatus 1A, the temperature sensors 20A to 20D are provided inside the FPGA 10.

The signal pattern generators 17A to 17D are provided, inside the FPGA 10, in the vicinity of the corresponding circuit arrangement regions 11A to 11D. The signal pattern generators 17A to 17D generate and output specific signal patterns at predetermined intervals.

The check circuits 18A to 18D receive respective signal patterns output from the corresponding signal pattern generators 17A to 17D, and detect errors occurring in the received signal patterns. The check circuits 18A to 18D grasp respective normal signal patterns output from the corresponding signal pattern generators 17A to 17D, and each of them compare the normal signal pattern and the received signal pattern, thereby detecting an error occurring in the received signal pattern. Each of the check circuits 18A to 18D outputs the error detection result at predetermined intervals.

The error detection results output from the check circuits 18A to 18D are stored in the corresponding score management circuits 19A to 19D. Each of the score management circuits 19A to 19D derives scores based on stored error detection results.

The following Table 2 illustrates an example of scores derived by the score management circuits 19A to 19D. The score management circuits 19A to 19D stores error detection results $D_1, D_2, D_3, \ldots$ output from the corresponding check circuits 18A to 18D at predetermined intervals.

TABLE 2

| Error Detection Results | $D_1$ | $D_2$ | $D_3$ | ... |
|---|---|---|---|---|
| Score Based on Error Detection Results | $c_1$ | $c_2$ | $c_3$ | ... |

The score management circuits 19A to 19D derive scores $c_1, c_2, c_3, \ldots$ determined according to the error detection results $D_1, D_2, D_3, \ldots$ at the respective time, and store them in a memory (not illustrated). For example, in a case where the error detection result $D_n$ indicates an uncorrectable error (for example, a 2-bit error), the score management circuits 19A to 19D derives and records a relatively large value (for example, 5) as the score $c_n$ corresponding to the error detection result $D_n$. In a case where the error detection result $D_n$ indicates a correctable error (for example, a 1-bit error), the score management circuits 19A to 19D derives and records a relatively small value (for example, 1) as the score $c_n$ corresponding to the error detection result $D_n$. In a case where the error detection result $D_n$ indicates that there is no error, the score management circuits 19A to 19D derive and record, for example, 0 as the score $c_n$ corresponding to the error detection result $D_n$. The scores $c_1, c_2, c_3, \ldots$ determined according to the error detection results $D_1, D_2, D_3, \ldots$ are an example of the third score in the disclosed technology.

In step S1 of the flowchart illustrated in FIG. 2, the processor 12 that executes the failure prediction program 31 acquire the scores $(a_1, a_2, a_3, \ldots, b_2, b_3, \ldots)$ stored in the score management circuits 14A to 14D and the scores $(c_1, c_2, c_3, \ldots)$ stored in the score management circuits 19A to 19D.

In step S2, the processor 12 tabulates the acquired scores $(a_1, a_2, a_3, \ldots, b_2, b_3, \ldots, c_1, c_2, c_3, \ldots)$ for each of the circuit arrangement regions 11A to 11D. For example, the processor 12 performs the process of tabulating the scores $(a_1, a_2, a_3, \ldots, b_2, b_3, \ldots, c_1, c_2, c_3 \ldots)$ for each of the circuit arrangement regions 11A to 11D. The subsequent processes are the same as those of the failure prediction apparatus 1 according to the first embodiment.

In the FPGA 10, a single event upset (SEU) in which the data recorded in the memory is reversed may occur by radiation of radioactive rays such as cosmic rays. The SEU may cause the destruction of the circuit data recorded in the circuit arrangement regions 11A to 11D of the FPGA 10. For example, the SEU may be a cause of a failure of the logic circuit constructed in the circuit arrangement regions 11A to 11D.

According to the failure prediction apparatus 1A according to the second embodiment of the disclosed technology, the influence of the radioactive rays causing the SEU is exerted on the signal pattern output from the signal pattern generators 17A to 17D, and as a result, is reflected on the scores derived by the score management circuits 19A to 19D. Since the signal pattern generators 17A to 17D are provided in the vicinity of the corresponding circuit arrangement regions 11A to 11D, the scores derived by the score management circuits 19A to 19D indicate the possibility of the occurrence of the SEU in the circuit arrangement regions 11A to 11D.

In this way, the failure prediction apparatus 1A derives scores based not only on the outputs of the temperature sensors 20A to 20D, but also on errors generated in the output signals of the signal pattern generators 17A to 17D. The failure prediction apparatus 1A makes a determination on the possibility of the occurrence of a failure with respect to each of the circuit arrangement regions 11A to 11D based on the tabulation value of the scores tabulated for each circuit arrangement region. Therefore, the failure prediction apparatus 1A is capable of performing a failure prediction taking into consideration not only heat stress but also the influence of radioactive rays such as cosmic rays with respect to each of the circuit arrangement regions 11A to 11D.

Third Embodiment

Figure 6A:
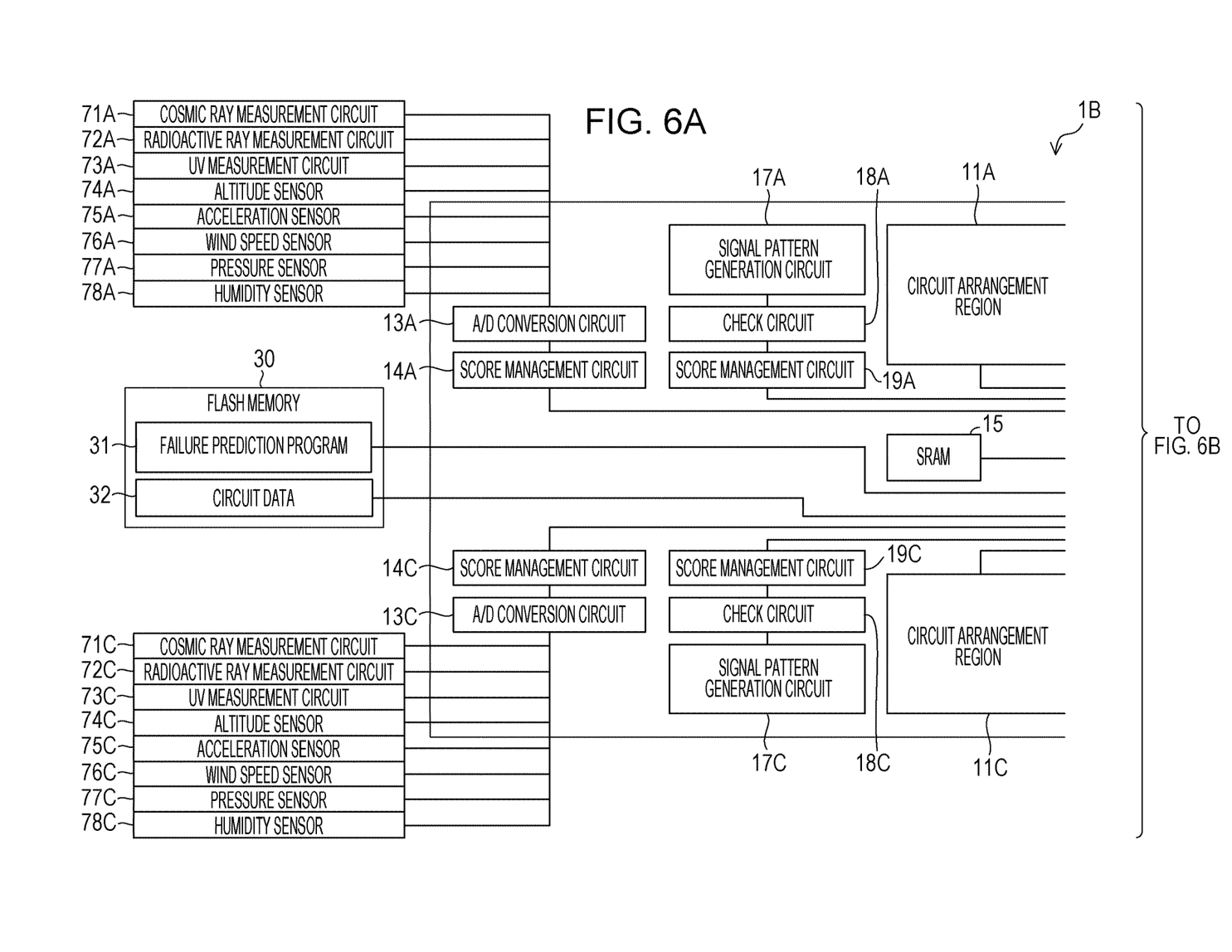
FIGS. 6A and 6B are a block diagram illustrating an example of a configuration of a failure prediction apparatus according to a third embodiment of the disclosed technology.
Figure 6B:
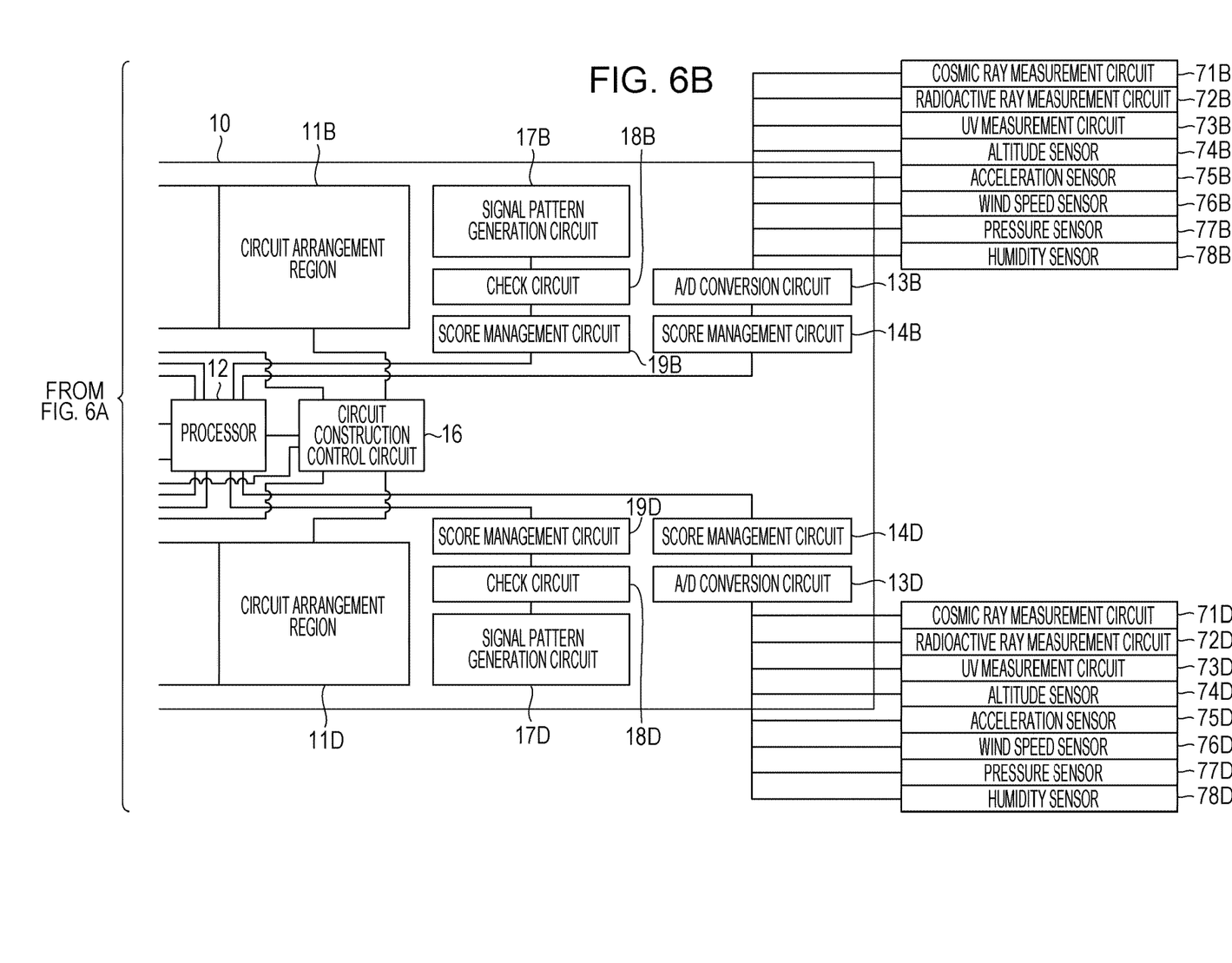

FIGS. 6A and 6B are a block diagram illustrating an example of a configuration of a failure prediction apparatus 1B according to a third embodiment of the disclosed technology. The failure prediction apparatus 1B includes altitude sensors 74A to 74D, acceleration sensors 75A to 75D, wind speed sensors 76A to 76D, pressure sensors 77A to 77D, and humidity sensors 78A to 78D instead of the temperature sensors 20A to 20D of the failure prediction apparatus 1A (see FIG. 5) according to the second embodiment. The altitude sensors 74A to 74D, the acceleration sensors 75A to 75D, the wind speed sensors 76A to 76D, the pressure sensors 77A to 77D, and the humidity sensors 78A to 78D correspond to the circuit arrangement regions 11A to 11D, respectively, and are provided in the vicinity of the corresponding circuit arrangement regions. The failure prediction apparatus 18 may further include a plurality of temperature sensors (not illustrated in FIGS. 6A and 6B) corresponding to the circuit arrangement regions 11A to 11D.

The failure prediction apparatus 1B includes cosmic ray measurement circuits 71A to 71D, radioactive ray measurement circuits 72A to 72D, and UV measurement circuits 73A to 73D. The cosmic ray measurement circuits 71A to 71D, the radioactive ray measurement circuits 72A to 72D, and the UV measurement circuits 73A to 73D correspond to the circuit arrangement regions 11A to 11D, respectively, and are provided in the vicinity of the corresponding circuit arrangement region. The above-mentioned various sensors and measurement circuits are connected to the score management circuits 14A to 14D via corresponding analog-to-digital conversion circuits 13A to 13D. Those outputting digital values among the above-described various sensors and measurement circuits may be directly connected to the score management circuits 14A to 14D without through the analog-to-digital conversion circuits 13A to 13D.

The score management circuits 14A to 14D derive scores based on the outputs from the various sensors and the various measurement circuits. The score management circuits 14A to 14D stores the values measured by the various sensors and various measurement circuits at predetermined intervals. The score management circuits 14A to 14D derive scores determined according to the magnitudes of the measurement values for each sensor and for each measurement circuit at respective times and record the scores in the memory (not illustrated).

Table 3 below illustrates an example of scores derived by the score management circuits 14A to 14D.

TABLE 3

| Event | Score |
|---|---|
| Value Measured by Cosmic Ray Measurement Circuit Has Exceeded Threshold Value | 10 |
| Value Measured by Radioactive Ray Measurement Circuit Has Exceeded Threshold Value | 9 |
| Value Measured by UV Measurement Circuit Has Exceeded Threshold Value | 8 |
| Value Measured by Altitude Sensor Has Exceeded Threshold Value | 6 |
| Value Measured by Acceleration Sensor Has Exceeded Threshold Value | 5 |
| Value Measured by Wind Speed Sensor Has Exceeded Threshold Value | 4 |
| Value Measured by Pressure Sensor Has Exceeded Threshold Value | 3 |
| Value Measured by Humidity Sensor Has Exceeded Threshold Value | 2 |

The score management circuits 14A to 14D derive, for example, 10 as the score in a case where the values measured by the cosmic ray measurement circuits 71A to 71D exceed the threshold value, and derive, for example, 9 as the score in a case where the values measured by the radioactive ray measurement circuits 72A to 72D exceed the threshold value. The score management circuits 14A to 14D derive, for example, 8 as the score in a case where the values measured by the UV measurement circuits 73A to 73D exceeds the threshold value, and derive, for example, 6 as the score in a case where the values measured by the altitude sensors 74A to 74D exceeds the threshold value. The score management circuits 14A to 14D derive, for example, 5 as the score in a case where the values measured by the acceleration sensors 75A to 75D exceeds the threshold value, and derive, for example, 4 as the score in a case where the values measured by the wind speed sensors 76A to 76D exceeds the threshold value. The score management circuits 14A to 14D derive, for example, 3 as the score in a case where the values measured by the pressure sensors 77A to 77D exceeds the threshold value, and derive, for example, 2 as the score in a case where the values measured by the humidity sensors 78A to 78D exceeds the threshold value.

It is preferable that the scores derived by the score management circuits 14A to 14D be determined according to the magnitude of the risk that the FPGA 10 may fail in a case where the values measured by the various sensors and the various measurement circuits exceed the threshold value. In the example illustrated in Table 3, in a case where the values measured by the cosmic ray measurement circuits 71A to 71D exceeds the threshold value, the risk that the FPGA 10 may fail is probably relatively high, so that a relatively high score (10) is derived. On the other hand, in a case where the values measured by the humidity sensors 78A to 78D exceed the threshold value, the risk that the FPGA 10 may fail is probably relatively low, so that a relatively low score (2) is derived.

In step S1 of the flowchart illustrated in FIG. 2, the processor 12 executing the failure prediction program 31 acquires the scores stored in the score management circuits 14A to 14D based on the values measured by the sensors and the measurement circuits, and the scores stored in the score management circuits 19A to 19D.

In step S2, the processor 12 tabulates the acquired scores for each of the circuit arrangement regions 11A to 11D. For example, the processor 12 performs the process of tabulating scores based on the values measured by various sensors and various measurement circuits for each of the circuit arrangement regions 11A to 11D.

As described above, the failure prediction apparatus 1B according to the present embodiment includes a plurality of kinds of sensors (the altitude sensors 74A to 74D, the acceleration sensors 75A to 75D, the wind speed sensors 76A to 76D, the pressure sensors 77A to 77D, and the humidity sensors 78A to 78D), and a plurality of kinds of measurement circuits (the cosmic ray measurement circuits 71A to 71D, the radioactive ray measurement circuits 72A to 72D, and UV measurement circuits 73A to 73D), all of which are provided corresponding to respective circuit arrangement regions 11A to 11D. Since the various sensors and the various measurement circuits are provided in the vicinities of the corresponding circuit arrangement regions 11A to 11D, the outputs from the various sensors and the various measurement circuits indicate the magnitudes of stresses applied to the corresponding circuit arrangement regions 11A to 11D. The failure prediction apparatus 1B derives the scores based on the outputs from various sensors and various measurement circuits, and makes a determination on the possibility of the occurrence of a failure with respect to each of the circuit arrangement regions 11A to 11D based on the tabulation value of the scores tabulated for each circuit arrangement region. According to the failure prediction apparatus 1B, different kinds of stresses are reflected on the scores, so that it is possible to predict the occurrence of a failure with respect to each of the circuit arrangement regions 11A to 11D with higher accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A failure prediction apparatus comprising: a memory; and
   a processor coupled to the memory and configured to:
   acquire a score based on an output of each of a plurality of sensors associated with each of a plurality of circuit arrangement regions, in each of the plurality of circuit arrangement regions a logic circuit constructed by programming is arrangeable;
   tabulate the scores from the plurality of circuit arrangement regions;
   determine a possibility of an occurrence of a failure with respect to each of the plurality of circuit arrangement regions based on the tabulating; and
   reconstruct the logic circuit arranged in a circuit arrangement region which is determined to have the possibility of the occurrence of the failure.

2. The failure prediction apparatus according to claim 1, wherein the processor is configured to perform the process of reconstructing the logic circuit arranged in the circuit arrangement region having the score exceeding a threshold value among the plurality of circuit arrangement regions in a circuit arrangement region having the score less than the threshold value among the plurality of circuit arrangement regions.

3. The failure prediction apparatus according to claim 2, wherein, in a case where there are a plurality of circuit arrangement regions having the score exceeding a threshold value among the plurality of circuit arrangement regions, the processor is configured to reconstruct the logic circuit in an order of a priority determined with respect to each of the plurality of circuit arrangement regions.

4. The failure prediction apparatus according to claim 1, wherein each of the sensors includes a temperature sensor.

5. The failure prediction apparatus according to claim 1, wherein each of the sensors includes a sensor group including a plurality of different kinds of sensors.

6. The failure prediction apparatus according to claim 1, wherein the processor is configured to acquire, as the score, a first score which is determined according to a magnitude of the output of each of the sensors and a second score which is determined according to an amount of change in the output of each of the sensors within a predetermined period.

7. The failure prediction apparatus according to claim 6, wherein the processor is further configured to
   acquire a third score which is determined according to an error generating in a signal pattern corresponding to each of the circuit arrangement regions, and
   make a determination on a possibility of an occurrence of a failure with respect to each of the plurality of circuit arrangement regions based on a tabulation value of the first score, the second score, and the third score for each of the circuit arrangement regions.

8. A failure prediction method executed by a processor included in a failure prediction apparatus, the method comprising:
   acquiring a score based on an output of each of a plurality of sensors associated with each of a plurality of circuit arrangement regions, in each of the plurality of circuit arrangement regions a logic circuit constructed by programming is arrangeable;
   tabulating the scores from the plurality of circuit arrangement regions;
   determining a possibility of an occurrence of a failure with respect to each of the plurality of circuit arrangement regions based on the tabulating; and
   reconstructing the logic circuit arranged in a circuit arrangement region which is determined to have the possibility of the occurrence of the failure.

9. A non-transitory computer-readable recording medium storing a program that causes a processor included in a failure prediction apparatus to execute a process, the process comprising:
   acquiring a score based on an output of each of a plurality of sensors associated with each of a plurality of circuit arrangement regions, in each of the plurality of circuit arrangement regions a logic circuit constructed by programming is arrangeable;
   tabulating the scores from the plurality of circuit arrangement regions;
   determining a possibility of an occurrence of a failure with respect to each of the plurality of circuit arrangement regions based on the tabulating; and
   reconstructing the logic circuit arranged in a circuit arrangement region which is determined to have the possibility of the occurrence of the failure.

10. A circuit failure predicting method comprising:
    acquiring data regarding each of a plurality of circuits from a plurality of sensors;
    determining failure scores for each of the plurality of circuits based on the data;

storing the failure scores respectively in each of the plurality of circuits;
acquiring the failure scores from the plurality of circuits;
tabulating the failure scores from the plurality of circuits;
determining whether a failure is possible for at least one of the plurality of circuits based on the tabulating; and
reconstructing a logic circuit when a determination is made that the failure is possible.

11. The circuit failure predicting method of claim 10, wherein the determining comprises comparing the failure scores tabulated with a threshold value.

12. The circuit failure predicting method of claim 11, wherein the determining determines that the failure is possible when a failure score is equal to or greater than the threshold value.

13. The circuit failure predicting method of claim 11, wherein the determining determines that the failure is not possible when a failure score is less than the threshold value.

14. The circuit failure predicting method of claim 11, wherein the reconstructing comprises stopping a circuit having a failure score equal to or greater than the threshold.

15. The circuit failure predicting method of claim 11, wherein the reconstructing comprises erasing a logic circuit having a failure score equal to or greater than the threshold.

16. The circuit failure predicting method of claim 10 further comprising identifying a reconstruction priority based on the tabulating.

\* \* \* \* \*